G. E. CARR.
BELT.
APPLICATION FILED FEB. 15, 1919.

1,303,027.

Patented May 6, 1919.

WITNESSES

INVENTOR
George E. Carr,
BY
ATTORNEYS

UNITED STATES PATENT OFFICE.

GEORGE EDWARD CARR, OF BOSTON, MASSACHUSETTS.

BELT.

1,303,027.  Specification of Letters Patent.  Patented May 6, 1919.

Application filed February 15, 1919. Serial No. 277,148.

*To all whom it may concern:*

Be it known that I, GEORGE E. CARR, a citizen of the United States, and a resident of Boston, in the county of Suffolk and State of Massachusetts, have invented a new and Improved Belt, of which the following is a full, clear, and exact description.

This invention relates to belts and particularly to an improved construction of connecting means for connecting the parts together or the ends together where it is used as an endless belt, so that a smooth continuous surface will be presented.

Another object in view is to provide a belt with a scarfed or stepped arrangement at the ends or at any point whereby the respective parts of the belt may overlap, the stepped formation being associated with a rubber connecting layer which will connect the parts together without presenting a raised portion on the inner surface of the belt.

Figure 1:
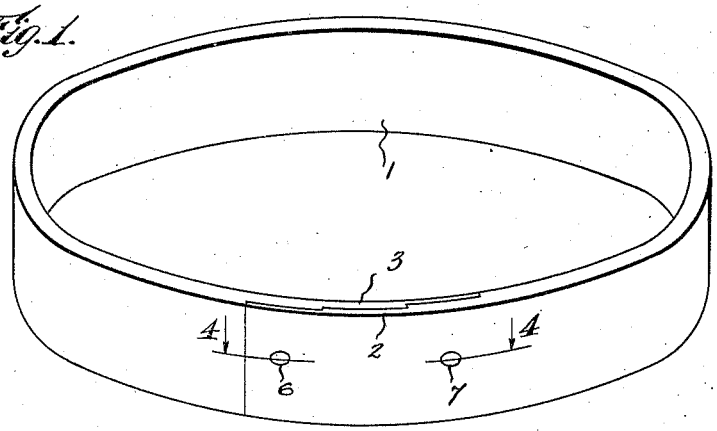
Figure 1 is a perspective view of a belt disclosing an embodiment of the invention.
Figure 2:
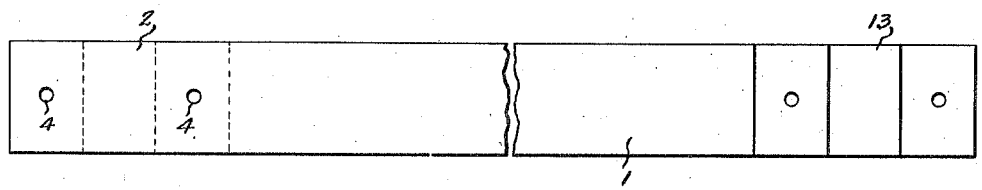
Fig. 2 is a plan view of the belt in a flat condition.
Figure 3:
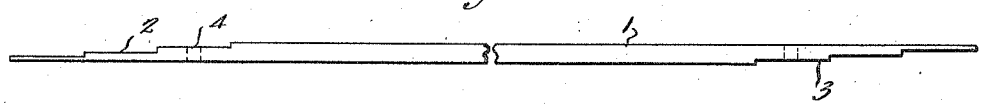
Fig. 3 is an edge view of the belt shown in Fig. 2.
Figure 4:
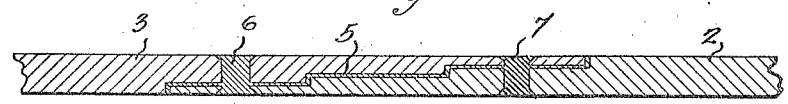
Fig. 4 is an enlarged sectional view through Fig. 1 on line 4—4.

Referring to the accompanying drawing by numerals, 1 indicates the body of the belt, which belt may be of leather, fabric, or any suitable material. If desired it may be made up of a number of different lengths connected together by a joint shown in Fig. 4, or may be connected together by a joint shown in Fig. 1, to make an endless structure as shown in Fig. 1. In any event the body 1 is stepped at the ends so that when the parts are brought together the ends of the body 1 will overlap to an appreciable extent the flat sections or steps parallel with the opposite flat face of the body. Before the ends 2 and 3 are placed in contact as shown in Fig. 4, rubber cement is placed on each end and after the same has been dried to a certain extent a comparatively thin layer of rubber is placed on one of the ends after which the ends are brought together as shown in Fig. 4 and pressed tightly together to cause the various parts to adhere. In forming the ends 2 and 3 one or any desired number of apertures 4 are used, so that after the layer of rubber 5 has been placed in position the joint may be placed in a vulcanizer and vulcanized under pressure, whereby the rubber is not only vulcanized, but forced into contact with the respective ends 2 and 3 and also the respective apertures 4 so as to make rubber rivets 6 and 7. Where the belt is made from fabric, leather, or similar material, when the apertures 4 are punched there will be usually left a more or less ragged edge so that when the rubber melts under the vulcanizing operation it will enter the apertures 4 and gradually flow around the ravelings so as to produce a substantially integral structure and comparatively smooth edges throughout and overlap with the face opposite the face on the body 1.

What I claim is:

1. A joint for belts comprising a stepped formation so that the parts of a belt may overlap, and a layer of rubber arranged between the stepped formation, said rubber merging into transversely arranged rivets.

2. A joint for belts comprising an overlapping stepped formation, the steps having a plurality of surfaces in different planes, but all of the planes parallel with the opposite face of the belt, said belt having apertures therethrough at the joint, and a rubber connecting member vulcanized in place so as to produce a connecting layer for the stepped formation of the joint, and rivets integral with the rubber connecting member extending through said apertures.

3. A belt joint comprising overlapping ends formed so that when overlapped the opposite face of the joint will be flush with the remaining part of the belt, and a layer of rubber between said overlapping members, said layer of rubber merging into transversely extending lugs acting as rivets.

4. The method of forming a joint for belts comprising the provision of a stepped construction at the ends of the belt which mate when brought together, forming apertures in said overlapping ends and then vulcanizing a layer of rubber between the overlapping ends, the vulcanizing operation taking place under pressure so that part of said rubber will flow into said apertures and form rivets.

GEORGE EDWARD CARR.